United States Patent [19]
Ingro

[11] 3,840,059
[45] Oct. 8, 1974

[54] HACK SAWS

[76] Inventor: Ben Ingro, 24 N. 73rd Ave., Elmwood Park, Ill. 60635

[22] Filed: Apr. 23, 1973

[21] Appl. No.: 353,336

[52] U.S. Cl. .......... 145/33 R, 145/34 R, 145/108 B
[51] Int. Cl. .......................................... B27b 21/02
[58] Field of Search .... 145/33 R, 35 E, 34 R, 34 A, 145/33 A, 33 AB, 33 B, 33 C, 33 D, 33 E, 32 R, 31 R, 31 AG, 108 B

[56] References Cited
UNITED STATES PATENTS

| | | | |
|---|---|---|---|
| 686,227 | 11/1901 | Jones | 145/33 C |
| 1,518,488 | 12/1924 | Dandrea | 145/33 A |
| 1,865,026 | 6/1932 | Loga | 145/34 R |
| 1,905,940 | 4/1933 | Lambert | 145/34 R |
| 1,950,973 | 3/1934 | Cross | 145/33 R |
| 2,101,362 | 12/1937 | Davidson | 145/33 R |
| 2,102,782 | 12/1937 | Blum | 145/33 R |
| 2,204,390 | 6/1940 | Albright | 145/33 R |
| 2,912,025 | 11/1959 | Thomas | 145/34 R |

FOREIGN PATENTS OR APPLICATIONS

| | | | |
|---|---|---|---|
| 525,161 | 5/1921 | France | 145/33 R |

Primary Examiner—Al Lawrence Smith
Assistant Examiner—J. T. Zatarga
Attorney, Agent, or Firm—Van Metre Lund

[57] ABSTRACT

A hack saw comprising a frame, a saw blade, and a handle. The handle as well as the saw blade can be positioned on any one of a number of cutting angles. In a preferred form, one end of the handle means serves as one pole of the saw blade holding means with the opposite end of the saw blade being secured by an opposite pole member which is threaded to recieve a thumb nut. Both pole members are journaled on the ends of the frame and have their axis traversing the longitudinal axis of the saw blade.

1 Claim, 8 Drawing Figures

HACK SAWS

This invention relates to an improvement in hack saws. More specifically, it relates to a hack saw in which the saw blade and the handle, both, can be changed to a different position in relation to the frame.

In the prior art the handle of the hack saw is rigidly fixed to the frame of the hack saw, while the hack saw blade can be positioned to a new cutting angle. It happens many times, for example, that it is necessary to saw down the length of a sheet of sheet metal. In this case the hack saw blade, which noramally is disposed on the same plane as the frame and the handle, is removed and the fittings, or pole members, which hold the ends of the saw blade to the ends of the frame, are turned to a new position so that the reinstalled blade will have a new plane as compared to the plane of the frame of the hack saw. While the saw blade has been changed to a new direction for cutting, the handle remains on the smae plane as the frame.

In cutting the above mentioned sheet metal, for example, the blade is guided downwardly on a vertical path. The frame and the handle are at right angle to the length of the cut. In order to hold the handle it is necessary to position the hand with the palm facing upwardly or downwardly with the palm and the fingers gripping the handle. A downward pressure while sawing causes the handle and saw to slip and rotate in the clenched palm which in turn causes a loss of power in the pressure applied to he cut. This in turn necessitates in getting a better grip on the saw handle and repositioning the saw in the hand and proceeding again with the sawing motion. A drawing, FIG. 8, is included which shows one method of holding the hack saw in the prior art when making a right angle cut.

In this invention, when the plane of the blade is turned at right angle, or to any other angle, in relation to the plane of the frame, the plane of the handle can also be rotated at right angle to the plane of the frame, with the plane of the blade and the plane of the handle being on a common plane. In sawing a vertical cut through a length of sheet metal the handle and the saw blade are in a vertical position while the frame is offset to one side in a horizontal position. With the handle in a vertical position, the hand which is clenched on the handle is in a normal position for sawing in the common manner.

It is an object of this invention to provide hack saws with a re-positionable handle the plane of which conincides with the plane of the saw blade when said saw blade is in any of its positional position in relation to the plane of the frame.

It is also an object of this invention to provide a hack saw in which the sawing pressure which is being applied to the handle of the hack saw is transmitted directly into the longitudinal axis of the saw blade.

It is also an object to provide hack saws with a positional handle in which a portion of the handle member traverses one end of the hack saw frame to serve as one of the poles for securing one end of the saw blade. This invention contemplates other objects, advantages and features which will become more fully apparent from the following detailed description taken in conjunction with the accompanying drawing which illustrates preferred embodiment and in which.

Figure 1:
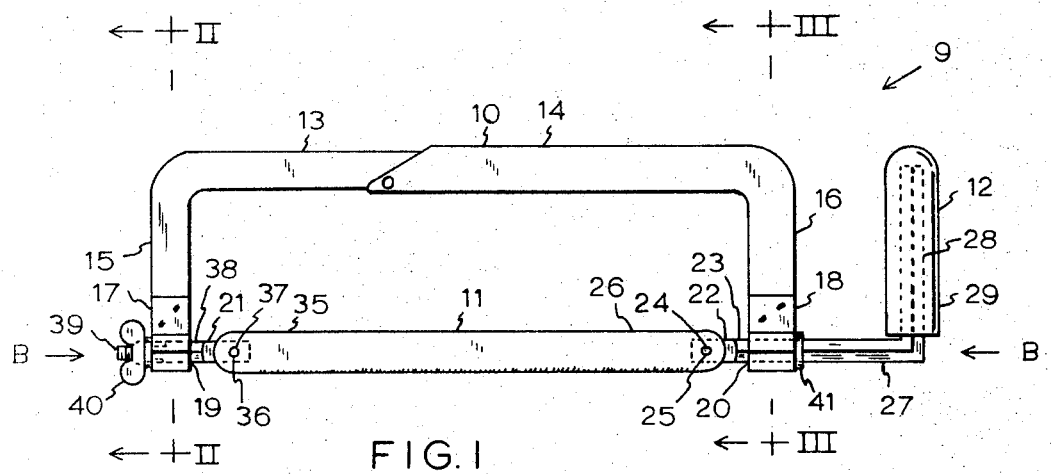
FIG. 1 shows a side elevational view of a hack saw constructed according to the principles of this invention.
Figure 2:
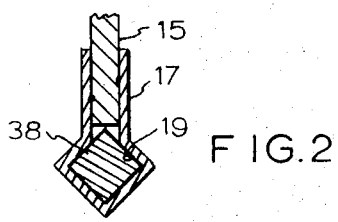
FIG. 2 shows a cross-sectional end view of the front pole member taken along lines II—II in FIG. 1.
Figure 3:
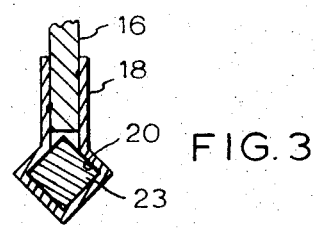
FIG. 3 shows a cross-sectional end view of the rear pole member taken along lines III—III in FIG. 1.
Figure 8:
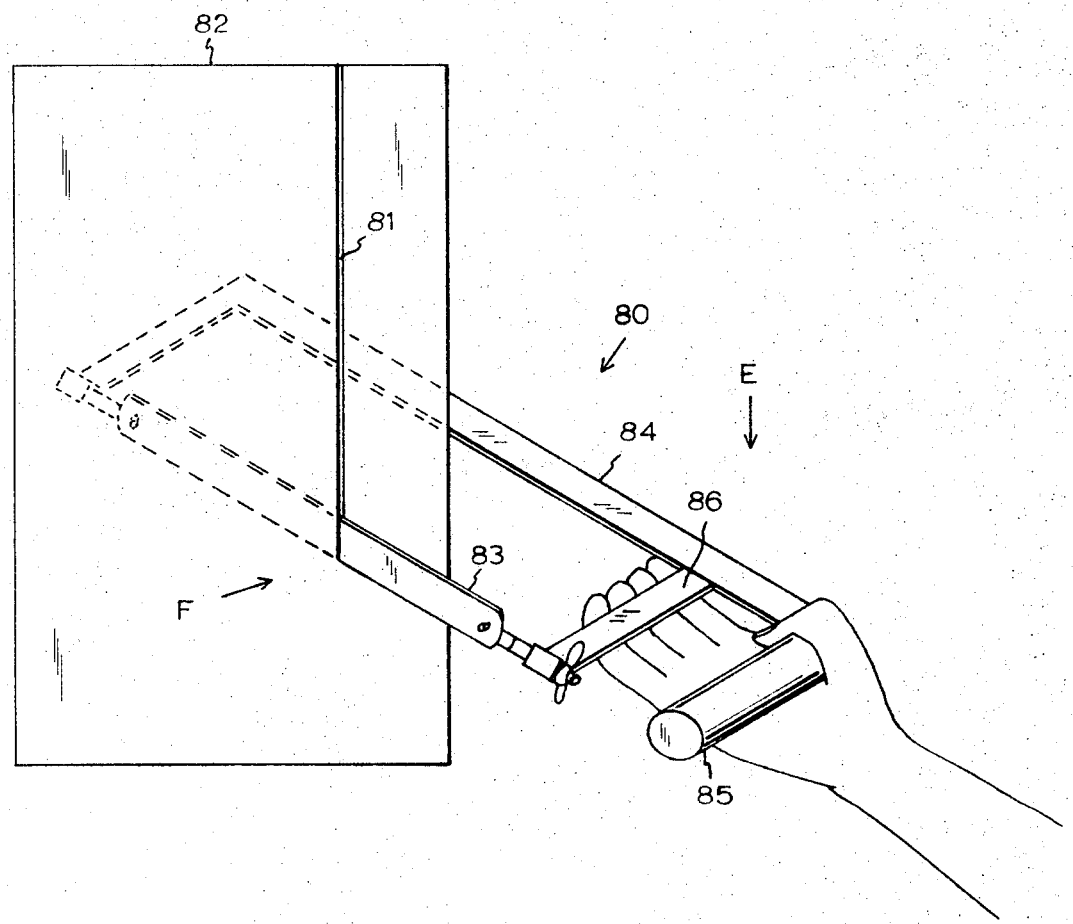

FIG. 8 shows a hack saw constructed according to the prior art and shows specifically one method of holding the hack saw in a vertical cut with the handle and frame turned at right angle to the plane of the blade. Referring to FIGS. 1, 2 and 3 and particularly to FIG. 1, there is shown a hack saw 9 which has a frame 10, a saw blade 11 and a handle 12. The frame 10 is shown having two telescoping sections 13 and 14. The frame 10 represents the whole assembly of parts 13 and 14. The frame 10 is normally in the form of a "U." The end portions 15 and 16 of the frame 10 normally have strap steel pieces 17 and 18 which are welded thereto. The strap steel pieces 17 and 18 normally have square holes 19 and 20 (shown in FIGS. 2 and 3). The holes 19 and 20 are aligned with the longitudinal axis B of the saw blade 11 which is supported by pole members 21 and 22 which are fitted in the said holes 19 and 20. Pole member 22 has a square shank 23 which cooperates with the square hole 20 which prevents the said pole member 22 from revolving therein. One end of the pole member 22 has a horizontally disposed pin 24 which traverses a hole 25 in one end 26 of the saw blade 11 for the purpose of removably securing said saw blade 11 to the said pole member 22. The pole member 22 is made from a square rod 27 one end of which serves as the above mentioned pole member 22 with the opposite end being bent upwardly to serve as a vertically disposed handle member 28. The handle member 28 can be covered with a plastic material 29, or the like, to improve the gripping action when it is hand held. The combination of the handle member 28 and the plastic grip 29 will be referred to as the handle 12.

The opposite end 35 of the saw blade 11 also has a hole 36 which is traversed, and removably secured, by a pin 37 which is horizontally disposed on the first mentioned pole member 21. The pole member 21 also has a square shank 38 and is removably secured in the square hole 19 of the first mentioned steel strap 17, which is also shown in FIG. 2. The free end 39 of the pole member 21 is threaded to recieve a thumb nut 40 by which the whole assembly is tightened. It will be noted that the thumb nut 40 is located in the front part of the hack saw 9 as compared with the prior art which has the thumb nut located at the rear of the saw near the handle. The arrangement of the handle means in this invention necessitates locating the thumb nut 40 towards the front. A flange 41 is provided, by welding, on the shank 23 to limit the forward travel of the said shank 23 when the thumb nut 40 is tightened. The flange 41 abuts on the rearmost portion of the steel strap piece 18.

Figure 4:
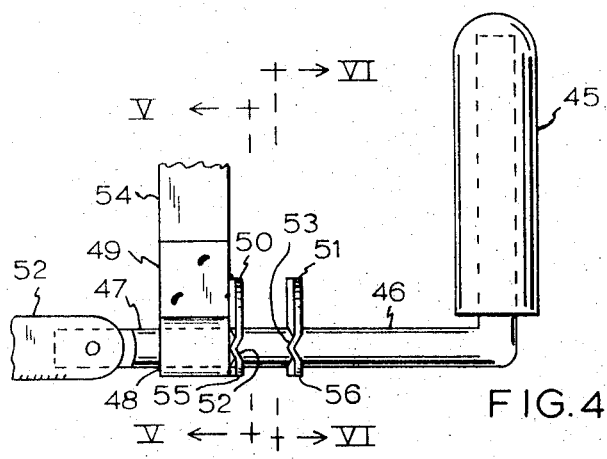
FIG. 4 shows a partially exploded side elevational view of an optional type of indexing means.
Figure 5:
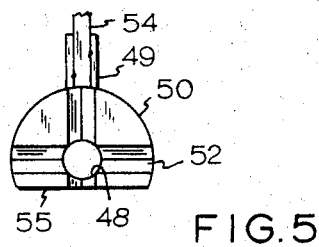
FIG. 5 shows a rear view of an indexing plate taken along lines V—V in FIG. 4.
Figure 6:
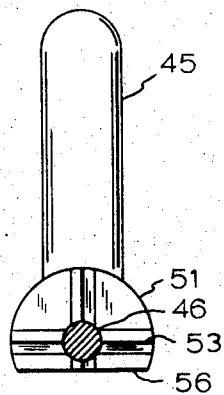
FIG. 6 shows a front view of a mating index plate and handle taken along lines VI—VI in FIG. 4.

FIG. 4 shows a handle means 45 which uses a round rod 46 instead of a square rod 27, as shown in FIGS. 1 and 3. The pole member 47 is substantially round and fits into a round hole 48 formed in the strap steel piece 49. The index means, or locking means, is in the form of a pair of mating discs 50 and 51. The first mentioned disc 50 is secured by welding, or other means, to the rear portion of the strap steel piece 49. The disc 50 has concavely formed index points 52 formed thereon which mate with convexly formed index points 53 which are formed on disc 51. The mating disc 50 and 51 are drawn together by the saw blade 52 when the thumb nut (not shown) in tightened. The thumb nut is located at the front end of the hack saw as afore mentioned. Thusly, the handle 45 and the saw blade 52 are locked in position and against rotation of their common axis in relation to the frame 54, which is shown in part. Discs 50 and 51 may be cut flat, 55 and 56, on the bottom to permit the saw blade 52 to cut flush to a surface (not shown). FIG. 1 shows the hack saw 9 with all parts, 10, 11 and 12, arranged for normal cutting.

Figure 7:
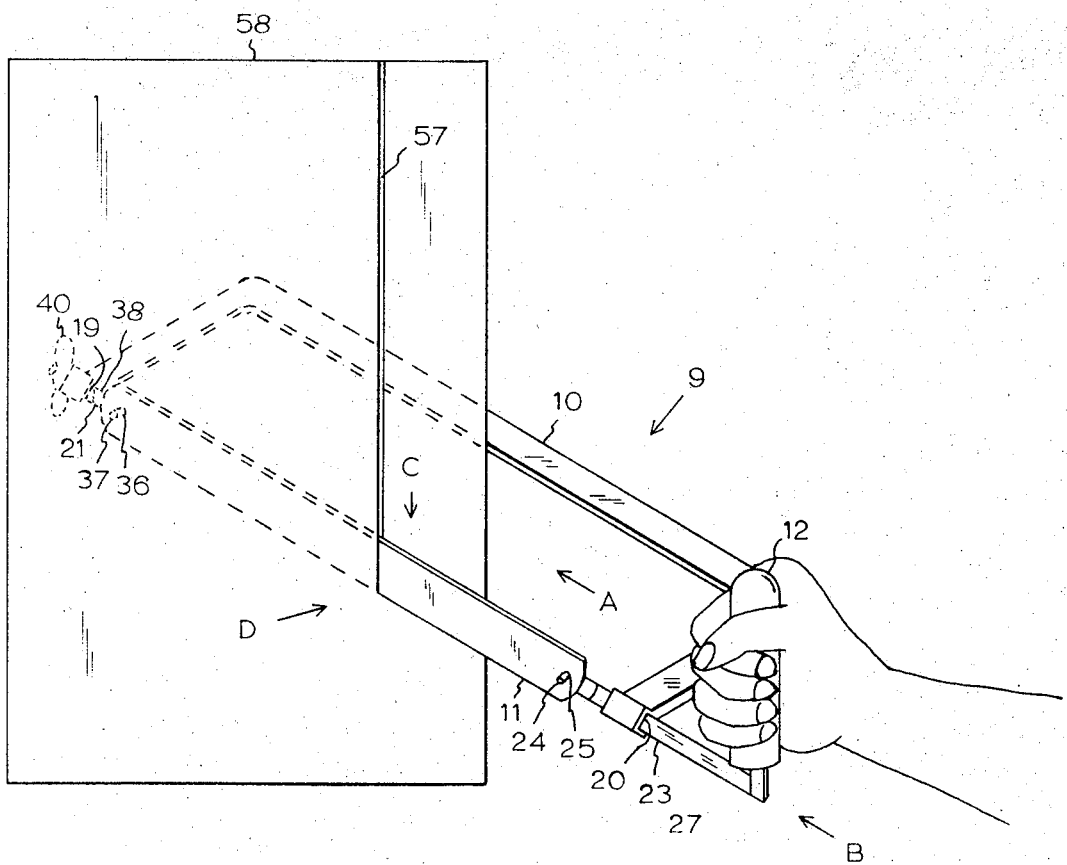
FIG. 7 shows the hack saw in this invention arranged to saw a vertical cut. The blade and the handle are in a vertical position with the frame being horizontally disposed at right angle to the said blade and handle.

In operation, and referring to FIGS. 1, 2, 3, 4, 5, 6 and 7, and particularly to Figs. 1 and 7, when it is necessary to make a vertical cut in a lengthy sheet of metal, as shown in FIG. 7, for example, the thumb nut 40 is loosened and the saw blade 11 is removed. The handle member 12 is then drawn rearwardly a short distance to allow the anti-rotational member 20 and 23, or 50 and 51 (FIG. 4), whichever is used, to disengage. The handle 12 is then rotated so that its plane is at right angle to the plane of the frame 10, as shown in FIG. 7, for example. The handle 12 is then moved forward into locking engagement with the frame 10. The front and opposite pole member 21 is then moved rearwardly to disengage the anti-rotational means 19 and 38. The pole member 21 is then rotated to the same plane as the handle 12, and the saw blade 11 is replaced in its securely supported position between the pole members 21 and 22 and secured thereto by the pins 24 and 37 which traverse the holes 25 and 36 in the saw blade 11. The thumb nut 40 is then tightened.

Referring to FIG. 7, the hack saw 9 is shown in a position for sawing a vertical cut 57 along a lengthy piece of sheet metal 58. The hack saw 9 is shown with a vertically disposed saw blade 11, vertically disposed handle 12, and a horizonatally disposed frame 10 which is offset to one side in order to clear the work. A hand is shown gripping the handle 12. It can be seen that the hand is disposed in a normal position for sawing. It can also be seen that the thrust of the hand (arrow A) transmits its power directly into the longitudinal axis of the saw blade 11 (arrow B). With this arrangement the hack saw 9 can be accurately guided and allows maximum pressure (arrow C) to be applied to the cut (arrow D).

FIG. 8 shows a hack saw 80 which is constructed according to the prior art. The hack saw 80 is shown in a position for sawing a vertical cut 81 in a lengthy piece of sheet metal 82. The hack saw 80 is shown with a vertically disposed saw blade 83, a horzontally disposed frame 84 and a horizontally disposed handle 85 which is permanently secured to the said frame 84. It can be seen that the hand and the arm of the operator must be positioned in an unnatural position in order to operate the hack saw, moreover, since the hand applies a downward force (arrow E) in order to apply pressure on the cut (arrow F) it usually occurs that the hand looses its grip on the handle 85 making it necessary for the hand to grip part of the frame portion 86 in order to hold the hack saw 80 more securely. Moreover, by the time the cut is finished the hand and the arm are substantially fatigued and the cut may be irregular and out of line. Further, due to the unnatural position of the hand and the lack of adequate grip on the hack saw only a minimal amount of pressure can be applied to the cut (arrow F) thus prolonging the cutting operation.

Referring back to FIGS. 1, 2, 3, 4, 5, 6 and 7, it is shown that four positions are possible in positioning the saw blade and the handle in relation to the frame. However, any number of positions may be provided in positioning the angle of the saw blade and the handle in relation to the frame.

It will be appreciated that other modifications and variations may be effected without departing from the spirit and scope of the novel concepts of this invention.

I claim as my invention:

1. A hack saw for use with a flat elongated blade having a longitudional axis and teeth along one longitudional cutting edge thereof projecting in one direction away from said londtudional axis, comprising: a pair of pole member for connection to opposite ends of said blade in fixed angular relationship to the plane of said blade, a generally U-shaped frame substantially in one plane and including an elongated base portion and a pair of end portions projecting from the opposite ends of said base portion, support means on the terminal ends of said end portions supporting said pole members to support said blade in generally parallel relation to said base portion of said frame, said support means being arranged for angular adjustment of the position of said pole members about an axis aligned with said longitudional axis of said blade and for angular adjustment of the plane of said blade relative to the plane of said frame to positions including a first position in which the plane of said blade is parallel to the plane of said frame and in which said teeth project in a direction away from said base portion of said frame and second and third positions in both of which the plane of said blade is transverse to the plane of said frame and in which said teeth project in opposite directions from the plane of said frame, and handle means rigidly connected to one of said pole members and extending in generally coplanar relation to said blade and away from said longitudional axis of said blade in a direction opposite said one direction of projection of said teeth with all portions of said handle means on one side of the plane transverse to the plane of said blade and through the longitudional cutting edge thereof.

* * * * *